Oct. 14, 1941.        H. A. BECKSTROM        2,259,196
ENGINE
Filed June 3, 1940        2 Sheets-Sheet 2

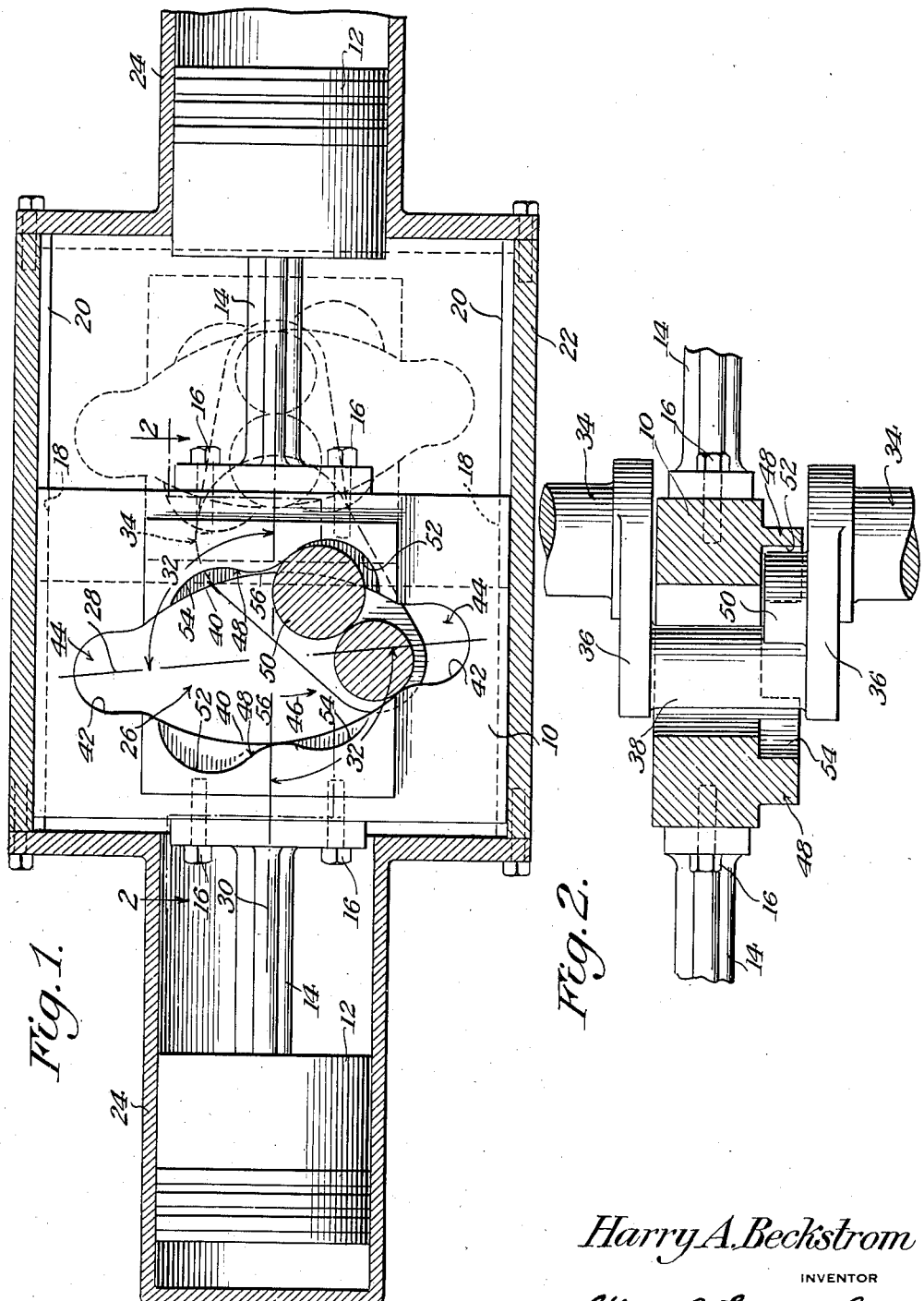

Harry A. Beckstrom
INVENTOR

BY Victor J. Evans & Co.
ATTORNEYS

Patented Oct. 14, 1941

2,259,196

UNITED STATES PATENT OFFICE 2,259,196

ENGINE

Harry A. Beckstrom, Seattle, Wash.

Application June 3, 1940, Serial No. 338,642

5 Claims. (Cl. 74—50)

My invention relates to engines, particularly of the internal combustion type, and includes among its objects and advantages the provision of a novel crosshead structure for converting reciprocatory motion of the pistons into rotary motion of the crankshaft.

In my copending application for patent on Engines, Serial No. 253,687, filed January 30, 1939, I illustrate a crosshead structure along the general lines of the instant case but so fashioned as to necessitate a stud pin on the crank arm of the crankshaft. The present invention makes use of a crosshead structure designed for coaction with a crank pin connected with two crank arms in the usual manner, in which novel stabilizing means are incorporated, and in which the crosshead structure is so fashioned as to permit a series of crossheads to be operatively connected with one crankshaft having a corresponding number of crank arms.

The present invention also embodies a crosshead structure designed for connection with opposed pistons, in which the crosshead is guided in its reciprocatory path and is further fashioned in such manner that the power of a particular piston delivers a powerful leverage on the crank. In addition, the crosshead is so fashioned as to be actuated through a stroke of considerably less length than the diameter of the circle described by the crank pin.

In the accompanying drawings:

Figure 1 is an elevational view of a crosshead in accordance with my invention, in which two opposed pistons are rigidly connected therewith and the crosshead guided for movement in a reciprocatory path;

Figure 2 is a sectional view taken substantially along the line 2—2 of Figure 1 with the crank arm illustrated in elevation;

Figure 3:
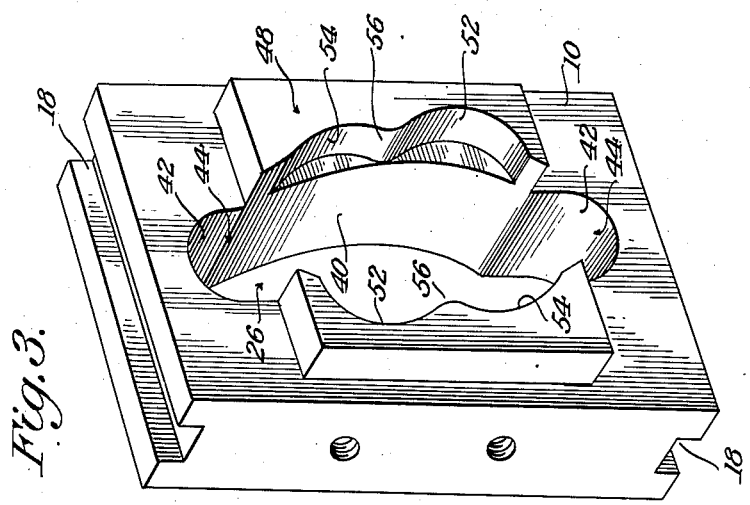
Figure 3 is a perspective view of the crosshead.

In the embodiment selected to illustrate my invention, I make use of a crosshead 10 to which opposed pistons 12 are fixedly connected through the medium of rods 14 which are bolted to the crosshead, as at 16. Crosshead 10 is in the nature of a relatively thick plate of rectangular configuration, and Figs. 1 and 3 illustrate the crosshead as being provided with grooves 18 for the reception of ribs 20 formed on two opposed walls of the crank case 22. The pistons 12 operate in opposed cylinders 24 and the piston rods 14 are rigidly connected with their respective pistons 12.

The crosshead 10 is provided with a generally elliptically shaped slot or opening 26, the major axis 28 of which is obliquely arranged to the piston axis 30, so that the angles 32 exceed ninety degrees, but the opening 26 is symmetrically fashioned with respect to the axis line 28 when viewed according to Fig. 1. The crankshaft 34 of Fig. 2 includes the usual crank arms 36 and crank pin 38. The crank pin 38 operates in the opening 26 and the crank arms 36 are positioned on opposite sides of the crosshead 10.

Opening 26 is characterized by gently curved walls 40 and more sharply curved walls 42 which provide opposed semi-circular pockets 44 having diameters such that the crank pin 38 may enter therein but fit snugly against the wall 42. However, the crank pin 38 may rotate freely relatively to the walls 42. The crankshaft 34 rotates in the direction of the arrow 46 and the crank pin 38 moves along the walls 40 and 42 during reciprocation of the crosshead.

Fig. 1 illustrates the position of the crank pin 38 when the left-hand piston 12 is in the firing position. At this time, the crank pin 38 has rotated substantially forty-five degrees beyond the axis line 30. Accordingly, the crank pin 38 is so positioned that the crank arms of the crankshaft 34 will derive an enormous leverage from the piston so that all the power from the explosion is employed in a maximum degree to turn the crankshaft. Movement of the crank pin 38 forty-five degrees beyond the full line position of Fig. 1 places the crank pin inside the adjacent pocket 44, and further travel of the crank pin brings it into sliding engagement with the right-hand wall 40. As the crank pin reaches a position along the right-hand wall 40 corresponding to the position it occupies on the left-hand wall 40 of Fig. 1, the right-hand piston 12 will have been moved to its firing position and the power of the explosion is delivered to the crankshaft when the pin 38 is in its most advantageous position.

The crosshead 10 is provided with stabilizing cams 48 for coaction with a stabilizing bearing member or pin 50 welded or otherwise secured to one of the crank arms 36. Stabilizing cams 48 are identical in construction and operation and extend along the two curved walls 40. Each stabilizing cam includes concaved faces 52 and 54 with the two faces in each cam interconnected for continuity by a convexed face 56.

Figure 4:
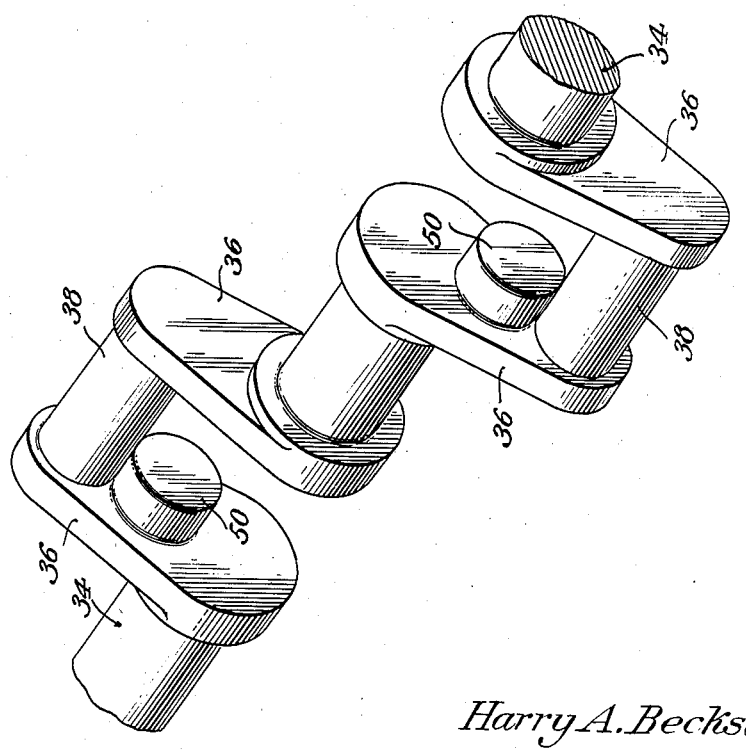
Figure 4 is a perspective view of a crankshaft having a plurality of crank arms for coaction with crossheads such as the one illustrated in Figs. 1 and 3.

Stabilizing pin 50 has its axis paralleling the axis of the crank pin 38 and the two pins lie in juxtaposed relation, as illustrated in Figs. 1 and 4. The stabilizing pin 50 has its axis located between the axis of the pin 38 and the crankshaft 34, in addition to lying in a common plane therewith. Thus the stabilizing pin 50 will describe a circle of considerably less diameter than the crank pin 38, and the stabilizing pin is so located as to glide along the respective stabilizing cam faces 52, 54 and 56.

Figs. 2 and 3 illustrate the stabilizing cams 48 as projecting laterally of the crosshead 10, and Fig. 2 illustrates the stabilizing cams as being closely spaced from one of the crank arms 36, with the opposite face of the crosshead 10 similarly spaced from the other crank arm. The stabilizing pin 50 is circular in cross section and glides easily and continuously along the respective cam faces 52, 54 and 56, so that the stabilizing pin and one of the stabilizing cams are in stabilizing engagement during each stroke of the crosshead 10, with the exception of that portion of the stroke when the crank pin 38 is confined in the pockets 44.

The invention is so devised as to permit the incorporation of the stabilizing structure in a series of crossheads for coaction with a corresponding series of cranks. Fig. 4 illustrates two cranks in the crankshaft 34, but Figs. 1 and 2 illustrate one crank only since a series of cranks in an engine structure would amount to duplication so far as illustration is concerned. The engine may be of the four-cycle type. The valve structure and ignition system may be of the conventional types and need not be described since the invention is directed to the crosshead and stabilizing features.

The travel of the crosshead 10 is less than the diameter described by the crank pin 38 by at least twenty-five per cent. In addition, the crosshead is fashioned to deliver power to the crank pin in the most advantageous position of the crank, and the stabilizing cams 48 coact with the stabilizing pin 50 to provide an advantageous stabilizing function. The crank pin 38 moves smoothly along the faces 40 and the stabilizing pin 50 also travels smoothly along the respective faces 52, 54 and 56. This is also true with respect to rotation of the crank pin 38 with respect to the faces 42 of the pockets 44.

Having thus described a certain embodiment of my invention in detail, it is, of course, understood that I do not desire to limit the scope thereof to the exact details set forth except insofar as those details may be defined in the appended claims.

I claim:

1. In an engine, a guide, a crosshead slidable in said guide, a reciprocatory piston connected with said crosshead for actuating the latter, said crosshead having a generally elliptically contoured opening extending therethrough with the walls of the opening comprising cam faces, a crankshaft having a crank arm means provided with a crank pin extending through said opening and operating on said cam faces for rotating the crankshaft when said crosshead is reciprocated, stabilizing cams on said crosshead along the major axis sides of said opening, and a stabilizing element carried by said crank arm means and coacting with said stabilizing cams for holding the crank pin in respective engagement with said cam faces.

2. In an engine, a guide, a crosshead slidable in said guide, a reciprocatory piston connected with said crosshead for actuating the latter, said crosshead having a generally elliptically contoured opening extending therethrough with the two walls of the opening comprising cam faces, said crosshead being provided with pockets each having a wall comprising a continuation of said two walls, said pockets being located at the major axis ends of said opening, a crankshaft having a crank arm means provided with a crank pin extending through said opening and operating on said two cam faces and on the walls of said pockets for rotating the crankshaft when said crosshead is reciprocated, two stabilizing cams on said crosshead along the major axis sides of said opening, and a stabilizing member carried by said crank arm means and respectively coacting with said cams for holding the crank pin in respective engagement with said two cam faces.

3. In an engine, a guide, a crosshead slidable in said guide, a reciprocatory piston connected with said crosshead for actuating the latter, said crosshead having a generally elliptically contoured opening extending therethrough with the two walls of the opening comprising cam faces, said crosshead being provided with pockets each having a wall comprising a continuation of said two walls, said pockets being located at the major axis ends of said opening, a crankshaft having a crank arm means provided with a crank pin extending through said opening and operating on said two cam faces and on the walls of said pockets for rotating the crankshaft when said crosshead is reciprocated, two stabilizing cams on said crosshead along the major axis side of said opening, a stabilizing member carried by said crank arm means and respectively coacting with said cams for holding the crank pin in respective engagement with said two cam faces, said crank arm means comprising two arms fixedly connected with the crankshaft with said crank pin fixedly connected with the two arms, and said stabilizing element comprising a shaft fixed to one of said two arms.

4. In an engine, a guide, a crosshead slidable in said guide, a reciprocatory piston connected with said crosshead for actuating the latter, said crosshead having a generally elliptically contoured opening extending therethrough with the two walls of the opening comprising cam faces, said crosshead being provided with pockets each having a wall comprising a continuation of said two walls, said pockets being located at the major axis ends of said opening, a crankshaft having a crank arm means provided with a crank pin extending through said opening and operating on said two cam faces and on the walls of said pockets for rotating the crankshaft when said crosshead is reciprocated, two stabilizing cams on said crosshead along the major axis sides of said opening, a stabilizing member carried by said crank arm means and respectively coacting with said cams for holding the crank pin in respective engagement with said two cam faces, said crank arm means comprising two arms fixedly connected with the crankshaft with said crank pin fixedly connected with the two arms, and said stabilizing element comprising a shaft fixedly connected with one of said two arms and located between the axis of the crank pin and the axis of the crankshaft.

5. In an engine, a guide, a crosshead slidable in said guide, a reciprocatory piston connected with said crosshead for actuating the latter, said crosshead having a generally elliptically contoured opening extending therethrough with the two walls of the opening comprising cam faces, said crosshead being provided with pockets each having a wall comprising a continuation of said two walls, said pockets being located at the major axis ends of said opening, a crankshaft having a crank arm means provided with a crank pin extending through said opening and operating on said two cam faces and on the walls of said pockets for rotating the crankshaft when said crosshead is reciprocated, two stabilizing cams on said crosshead along the major axis sides of said opening, said stabilizing cams extending laterally of said crosshead, said crank arm means comprising two crank arms having said crank pin fixedly connected therewith, with one of said two crank arms lying adjacent one side of said crosshead and the other of said two crank arms lying adjacent said stabilizing cams, and a stabilizing shaft fixedly connected with one of said two crank arms and paralleling said crank pin for coacting with said stabilizing cams for respectively holding the crank pin in respective engagement with said cam faces, said stabilizing shaft having its axis positioned between the axis of the crank pin and the axis of the crankshaft.

HARRY A. BECKSTROM.